United States Patent [19]
Bourbeau

[11] 3,866,099

[45] Feb. 11, 1975

[54] MOTOR POWER SUPPLY SYSTEM

[75] Inventor: Frank J. Bourbeau, Santa Barbara, Calif.

[73] Assignee: General Motors Corp., Detroit, Mich.

[22] Filed: Aug. 1, 1973

[21] Appl. No.: 384,604

[52] U.S. Cl. .................... 318/254, 318/227, 321/45, 318/138
[51] Int. Cl. .......................................... H02k 29/00
[58] Field of Search ........... 318/227, 230, 254, 138, 318/139; 321/5, 45

[56] References Cited
UNITED STATES PATENTS

| | | | |
|---|---|---|---|
| 2,202,711 | 5/1940 | Morack | 318/227 |
| 2,219,200 | 10/1940 | Schmidt | 318/227 |
| 3,262,036 | 7/1966 | Clarke et al. | 321/45 C |
| 3,321,697 | 5/1967 | Etter | 321/45 C |
| 3,418,550 | 12/1963 | Kolatorowicz | 318/254 |
| 3,600,658 | 8/1971 | Kuniyoshi | 318/254 |
| 3,624,483 | 11/1971 | Genuit | 321/45 |
| 3,678,358 | 7/1972 | Kolatorowicz | 318/254 |
| 3,706,924 | 12/1972 | Adler | 318/254 |
| 3,749,991 | 7/1973 | Kuniyoshi | 318/254 |

FOREIGN PATENTS OR APPLICATIONS

| | | | |
|---|---|---|---|
| 1,092,426 | 7/1965 | Great Britain | 321/45 |
| 1,199,793 | 8/1967 | Great Britain | 318/696 |

Primary Examiner—G. R. Simmons
Attorney, Agent, or Firm—C. R. Meland

[57] ABSTRACT

A power supply system for an electric motor of the type having a polyphase stator winding and a rotor provided with magnetic poles. The current supplied to the polyphase stator winding is controlled by a solid state switching circuit which operates to sequentially energize the respective phase windings of the polyphase winding. The switching circuit is comprised of a plurality of controlled rectifiers which are sequentially gated conductive under the control of a position sensor which senses the instantaneous position of the rotor or armature of the motor relative to the polyphase winding. The power supply for the motor switching circuit and the polyphase winding of the motor connected therewith is an inverter fed from a source of direct current. The alternating output of the inverter serves to commutate the controlled rectifiers of the switching circuit and the inverter and switching circuit are connected by a coupling capacitor. The motor has a field winding to develop the magnetic poles on the rotor which is supplied with direct current. The magnitude of this direct current is a function of current supplied to the input of the switching circuit from the inverter. The system includes an arrangement for reducing the transient loading of the inverter during operation of the switching circuit.

4 Claims, 1 Drawing Figure

PATENTED FEB 11 1975　　3,866,099
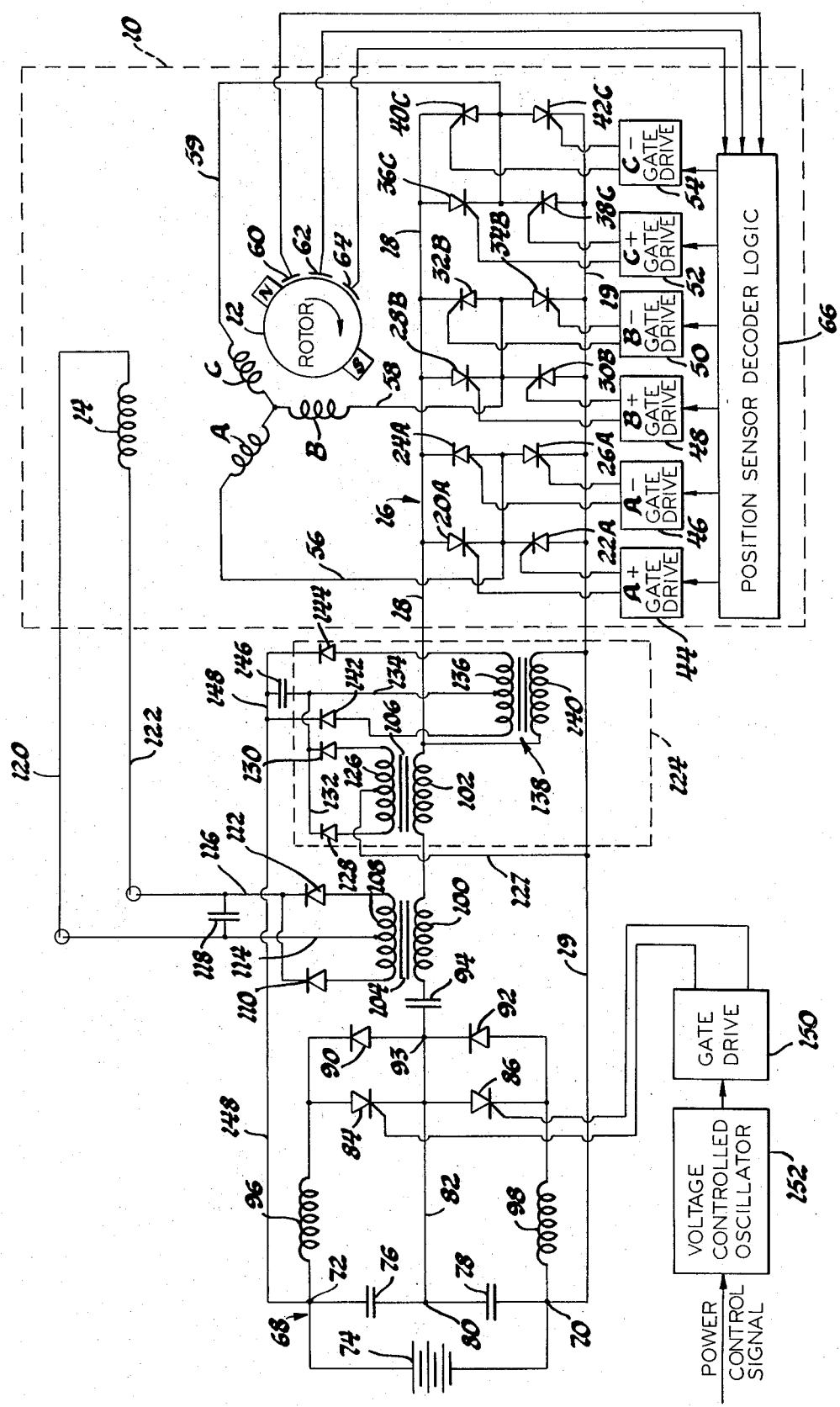

MOTOR POWER SUPPLY SYSTEM

This invention relates to a motor power supply system and more particularly to a motor power supply system of the type wherein a static switching circuit sequentially supplies current to a polyphase stator winding of the motor and to an arrangement where the motor has a rotor or armature provided with a plurality of magnetic poles. This type of motor has been variously termed as a brushless motor, a synchronous motor and at times has been termed an alternating current motor. Typical examples of such motor systems are disclosed in the U.S. Pat. Nos. to Mittag 2,193,932, to Campbell et al 3,297,926 and to Kirk 3,483,458.

The above-mentioned Mittag and Campbell et al patents are examples of brushless motor systems where the motor winding is energized from a source of direct voltage through a switching circuit that operates as a three-phase inverter. In systems of this type, where the switching elements are controlled rectifiers and where the voltage source is a direct voltage, it is necessary to provide some apparatus, such as a commutating capacitor, to shut-off a conducting controlled rectifier when it is desired that its conduction cease.

The need for such commutating apparatus can be eliminated if the switching circuit that feeds the motor winding is supplied with alternating current since in this case the controlled rectifiers are line-commutated by the alternating current source. Examples of this type of system are disclosed in the U.S. Pat. Nos. to Bedford 1,930,303 and Kirk 3,483,458. These two patents further indicate that it is possible to provide a three-phase voltage to a motor winding by a switching circuit that is supplied with either single phase or three-phase alternating current. Thus, in the FIG. 4 embodiment of Bedford a single phase alternating current source is used to feed a switching circuit comprised of twelve tubes while in Kirk a three-phase alternating current source feeds a switching circuit comprised of eighteen controlled rectifiers.

The present invention is concerned with a power supply system for a brushless motor where the primary source of voltage is a source of direct voltage. The primary source of direct voltage is connected to an inverter which has an alternating current output that is applied to the input of a controlled rectifier switching circuit that feeds the motor winding. With this arrangement, no commutating apparatus is required for the switching circuit since it is supplied with alternating current from the inverter and in this respect the system of this invention is similar to that disclosed in the above-mentioned Bedford and Kirk patents.

One of the principal features of this invention, however, which is not utilized in either Kirk or Bedford, is the provision of capacitive coupling between the output of the inverter and the input of the switching circuit that feeds the motor. By using a variable output frequency inverter in conjunction with a coupling capacitor it is possible to vary the voltage supplied to the switching circuit since the reactance of the capacitor varies as inverter frequency is varied.

It accordingly is one of the objects of this invention to provide a power supply system where an inverter is fed from a source of direct current and where the alternating output voltage of this inverter is capacitively coupled to a controlled rectifier switching circuit which sequentially energizes the phase windings of the motor. In carrying this object forward the voltage applied to the switching circuit can be varied by varying the output frequency of the inverter. This voltage variation is due to the varying reactance of the capacitive coupling between the inverter and switching circuit.

Another object of this invention is to provide a motor power supply system of the type described where the magnetic poles on the armature are developed by a field winding that is energized by direct current. The magnitude of the direct current supplied to the field winding is a function of input current to the switching circuit. This is accomplished by the utilization of a current transformer, which senses input current to the switching circuit, and which applies a voltage to the field winding which is proportional to the input current to the switching circuit.

Still another object of this invention is to provide a transient suppression circuit for the motor power supply system which is operative to reduce transient loading of the inverter that supplies power to the switching circuit and motor winding.

IN THE DRAWING

The single FIGURE drawing is a schematic circuit diagram of a motor power supply system made in accordance with this invention.

Referring now to the drawing, the reference numeral 10 generally designates a motor system that includes a motor and switching circuit for controlling the current supplied to a motor winding. The motor has a three phase Y-connected stator winding comprised of phase windings A, B and C. This three phase winding is wound in a conventional manner on the stator core of the motor. This motor has a rotor or armature designated by reference numeral 12. The rotor may be, for example, of the Lundell type and has a plurality of magnetic poles. The magnetic poles are developed by the field winding of the motor which has been designated by reference numeral 14. The field winding could be carried by the rotor of the motor in which case brushes can be provided to apply direct current to the field winding. To provide a completely brushless motor it can be arranged to have a fixed field winding, for example, like the motor disclosed in the U.S. Pat. No. to Collins et al 3,456,140. The field can also, if desired, be fed by a rotating transformer arrangement.

The rotor 12 of the motor is coupled to a load to be driven by the motor and the load may be, for example, a wheel of a vehicle such as a railway or highway vehicle.

The phase windings A, B and C are sequentially energized by a switching circuit comprised of twelve controlled rectifiers and generally designated by reference numeral 16. This switching circuit is energized from power supply input conductors 18 and 19. One group of controlled rectifiers of the switching circuit which controls the current flow to phase winding A are designated by reference numerals 20A, 22A, 24A and 26A. The group of controlled rectifiers that controls current to phase winding B are identified by reference numerals 28B, 30B, 32B and 34B. The group of controlled rectifiers that controls the current to phase winding C are designated by reference numerals 36C, 38C, and 40C and 42C. The firing of the controlled rectifiers are controlled by gate drive circuits 44, 46, 48, 50, 52 and 54. The gate drive circuits are conventional and when energized operate to gate pairs of controlled rectifiers to which they are connected conductive for predetermined lengths of time. The gate drive circuits have also been designated by letters indicating the phase sequence that is brought about by sequential energization of these drive circuits. As an example, the gate drive circuit 44 is connected with controlled rectifiers 20A and 22A. It will therefore be appreciated that when the gate drive circuit 44 applies a signal to these two controlled rectifiers they are gated conductive.

The system is arranged to sequentially energize the phase windings in a three phase sequence and is arranged such that a pair of phase windings are connected across power input conductors 18 and 20 for a predetermined length of time. As one example, when it is desired to energize phase windings A and B controlled rectifiers 20A and 22A and controlled rectifiers 32B and 34B are gated conductive to, in effect, provide a fullwave rectifying circuit. Assuming the voltage on conductor 18 is positive with respect to conductor 19 current will flow from conductor 18 through controlled rectifier 20A, through conductor 56, through phase windings A and B to conductor 58 and then through controlled rectifier 34B to conductor 19. When the input voltage reverses current still flows in the same direction through windings A and B with current now flowing through controlled rectifiers 22A and 32B. In order to provide current that flows into phase winding B (B- sequence) and out of phase winding A (A- sequence) rectifiers 28B, 30B, 24A and 26A are gated conductive. By switching other groups of controlled rectifiers conductive a three phase sequence is provided. This switching sequence is such that switching between the gate drive circuits 44–54 occurs each 60 electrical degrees. A gate drive circuit gates a pair of controlled rectifiers on, however, for 120 electrical degrees with the result that a given phase winding is energized periodically for substantially 120 electrical degrees as is known to those skilled in the art. This switching sequence is disclosed in the above mentioned U.S. Pat. No. to Kirk 3,483,458 where it is used in an 18 controlled rectifier converter.

The switching sequence of the controlled rectifiers of switching circuit 16 is controlled as a function of the angular position of the rotor 12 relative to the stator of the motor. This requires an arrangement that is capable of sensing the angular position of the rotor and causing a sequential switching of the controlled rectifiers of switching circuit 16 as a function of rotor position. This type of control can take various forms which are well known, see for example, the above mentioned U.S. Pat. Nos. 3,297,926 and 3,483,458 and for this reason this control is only illustrated schematically.

In order to sense rotor position, pickups 60, 62 and 64 are provided which may be spaced electrically by 120°. These pickups cooperate with a part (not illustrated) driven by the rotor which causes signals to be developed in the pickups. The pickups may operate on an electromagnetic coupling principle like U.S. Pat. No. 3,483,458. The signals developed in pickups 60, 62 and 64 are applied to a control circuit 66 identified schematically as position sensor decoder logic. This circuit controls the gate drive circuits 44–54 to provide proper sequential switching of the controlled rectifiers of switching circuit 16 as a function of rotor position.

The switching circuit 16 may be viewed as a solid-state commutator for correctly applying current of the proper polarity to the phase windings A, B and C of the motor as a function of the instantaneous position of the rotor or armature 12.

The power supply system for the motor system 10 includes a single-phase inverter generally designated by reference numeral 68. This inverter has input terminals 70 and 72 which are connected across a source of direct voltage 74. The source of direct voltage in railway applications may be a third rail power supply system. Connected directly across input terminals 70 and 72 are capacitors 76 and 78 having a common junction 80. The junction 80 is connected with a conductor 82 which is in turn connected to a common junction of controlled rectifiers 84 and 86 and to a common junction 93 of diodes 90 and 92. The conductor 82 is further connected directly to one side of a coupling capacitor designated by reference numeral 94. An inductor 96 is connected between junction 72 and a common connection of the anode of controlled rectifier 84 and the cathode of diode 90. Another inductor 98 is similarly connected between junction 70 and a common connection of the cathode of controlled rectifier 86 and the anode of diode 92.

The coupling capacitor 94, as will be more fully described hereinafter, forms part of a circuit for applying the output of the inverter 68 to the switching circuit 16. Thus it is seen that one side of the coupling capacitor 94 is connected to power input line 18 of the switching circuit 16 through the primary windings 100 and 102 of transformers 104 and 106. The secondary 108 of transformer 104 is center tapped. The output of secondary 108 is rectified by diodes 110 and 112 and this rectified voltage is applied to conductors 114 and 116 which have a capacitor 118 connected thereacross. The direct voltage applied to conductors 114 and 116 is utilized to energize the field winding 14 of the motor through conductors 120 and 122 which are connected to conductors 114 and 116.

The transformer 106 provides part of a reactive feedback network shown in dotted lines and designated by reference numeral 124. The secondary winding 126 of transformer 106 is center tapped with the tap connected to a conductor 127 which in turn is connected to power input conductor 19. This secondary winding 126 is connected with diodes 128 and 130 which serve to develop a direct voltage between conductors 132 and 127. The conductor 132 is connected to a conductor 134 which in turn is connected to the center tap of the secondary winding 136 of a transformer 138. The primary 140 of transformer 138 is connected across power input lines 18 and 19 and therefore responds to the voltage across these lines. The secondary winding 136 is connected to diodes 142 and 144 which apply a direct voltage to capacitor 146 connected between conductor 134 and conductor 148 which goes to junction 72. The purpose of this reactive feedback network will be more fully described hereinafter.

The switching of the inverter controlled rectifiers 84 and 86 is controlled by a conventional gate drive circuit designated by reference numeral 150. The gate drive circuit alternately applies gate firing signals to controlled rectifiers 84 and 86 at a predetermined frequency. The gate drive circuit receives signal information from a voltage controlled oscillator designated by reference numeral 152 and the frequency of this oscillator is controlled by a power control signal shown connected to the input of the oscillator. The power control signal is variable and determines the switching frequency of the controlled rectifiers 84 and 86 of the inverter.

The operation of the motor power supply system will now be described. When the system is energized an alternating voltage of a frequency determined by the power control signal is applied to conductors 18 and 19 from inverter 68. The switching of the controlled rectifiers of switching circuit 16 in synchronism with the position of rotor 12 causes current to be supplied sequentially to phase windings A, B and C of the motor through conductors 56, 58 and 59 connecting the switching circuit and the motor. Since the input to the switching circuit is an alternating voltage, this voltage serves to commutate or shutoff a given controlled rectifier that was previously conducting.

During operation of the inverter 68 the controlled rectifiers 84 and 86 are alternately gated conductive. When controlled rectifier 84 is gated conductive, current can flow through inductor 96, and through controlled rectifier 84 to junction 93 to one side of coupling capacitor 94. Current will also flow through controlled rectifier 84 to capacitor 78. Since the current path to capacitor 78 includes the inductor 96, the current reverses and flows through diode 90 causing a commutation of controlled rectifier 84. This corresponds to a half cycle of operation of inverter 68. When controlled rectifier 86 is then gated conductive, the same operation occurs through interaction of capacitor 76, controlled rectifier 86, inductor 98 and diode 92. The inverter 68 develops an alternating voltage between junctions 70 and 93 which is applied to switching circuit 16 through coupling capacitor 94.

During operation of the system the field winding 14 is supplied with a current the magnitude of which is proportional to the input current to the switching circuit 16 and therefore a function of current supplied to the motor phase windings. This alternating current passes through coupling capacitor 94 and primary winding 100 of current transformer 104 and is rectified to provide the direct voltage that energizes field winding 14 via conductors 114, 116, 120 and 122. This means that the motor is given a series characteristic.

During operation of the switching circuit 16 current is continuously switched from one phase to another. As a pair of controlled rectifiers are turned off current in the previously conducting phase does not cease at the instant a controlled rectifier is turned off. Instead the controlled rectifier that was conducting remains on for a duration of time equal to the time required for the AC input voltage from the inverter to reverse plus the time required for the reversed input voltage and counter EMF of the motor to remove the inductive energy in the motor winding. This energy is largely transferred to the coupling capacitor 94 and capacitors of the inverter 68. This results in a transient loading of the inverter resonant circuit which reduces the available turnoff time for controlled rectifiers 84 and 86. Successful operation with a given value of motor phase inductance can then be achieved only by using a coupling capacitor with a value small enough to limit the transient loading on the inverter 68 to an acceptable level.

In order to prevent this transient loading of the inverter the reactive feedback network 124 which has been described is provided. Prior to the switching transient developed between switching of the controlled rectifiers of switching circuit 16 the capacitor 146 is charged through the voltage transformer 138 to a DC voltage $E_1$ proportional to the steady state RMS value of an AC voltage $E_M$ applied to conductors 18 and 19 from inverter 68. During the phase current switching transient, the peak level of $E_M$ increases in amplitude causing an increase in capacitor charging current. Unless some means is provided to discharge capacitor 146, the capacitor would accumulate charge during each switching cycle of the switching circuit 16 ultimately raising the voltage to an undesirable level. In order to discharge the capacitor the current transformer 106 is provided which supplies a current feedback to the voltage source 74 which discharges the capacitor 146 to a level approximately equal to 0.9 of the peak level of $E_M$. This current feedback is desirable because the capacitor discharge current automatically adjusts to the magnitude of the current switching transient of the switching circuit 16 making both the discharge current and the switching transient magnitude proportional to the current supplied to the phase windings of the motor.

As has been previously pointed out, the inverter 68 is coupled to the motor system 10 by means of a coupling capacitor 94. Since the inverter 68 has an alternating output, the amount of high-frequency current going into the switching circuit 16 and hence the lower-frequency motor current will depend on the reactance of the coupling capacitor 94 which varies inversely with the output frequency of inverter 68. This means that the coupling capacitor operates as a power control element in conjunction with the variable output frequency of inverter 68. As more power is required by the motor, the power control signal can be varied to increase the output frequency of inverter 68 with the result that more current is supplied to the motor phase windings.

The features of this invention are applicable to systems other than those that convert single-phase power to three-phase power. Thus, where higher power levels are required it may be desirable to provide an arrangement where a three-phase to three-phase conversion is provided. This can be accomplished by using a switching circuit comprised of eighteen controlled rectifiers to feed the motor winding as disclosed in the above mentioned Kirk U.S. Pat. No. 3,483,458, rather than the 12 controlled rectifier switching circuit 16. In such an arrangement the three phase power is supplied to the 18 controlled rectifier switching circuit by three single phase inverters each of which is like inverter 68. The output voltages of the inverters are phase displaced to provide a three-phase alternating current input to the switching circuit. Three phase sources comprised of three single phase inverters are well known, one example being the U.S. Pat. No. to Turnbull 3,568,021. Where a three-phase source is used, three coupling capacitors are of course required rather than the single coupling capacitor 94 used with a single phase source. Each coupling capacitor in a three-phase system is connected in series between an output terminal of an inverter and an input terminal of the switching circuit.

Where a three-phase source is used, three current transformers can be used to energize the field winding 14 rather than a single transformer 104 as used with a system having a single-phase source. In this arrangement each current transformer senses current of a respective one of the three conductors connecting the three-phase source to the switching circuit. In such an arrangement the secondary windings of the transformer can be connected to the AC input terminals of a three-phase full-wave bridge rectifier circuit the direct current output terminals of which are connected to field winding 14.

As has been described the features of this invention are applicable to motor systems utilizing single phase to three phase conversion or three phase to three phase conversion. The features of this invention are also applicable to other conversion systems for example, three phase to six phase conversion and in general to any brushless motor system that can effectively utilize the capacitive coupling feature, the current transformer field energizing feature and reactive feedback feature described herein.

The range of power control that can be achieved by coupling capacitor 94 depends on its capacitance and the frequency range of the output frequency of inverter 68. By way of example, and not by way of limitation the output frequency of inverter 68 may have a range of 350 to 1,500 Hz. during power operation of the motor. With a coupling capacitor 94 of 50 microfarads the capacitive reactance of capacitor 94 varies from approximately 9.1 ohms at 350 Hz. to 2.1 ohms at 1,500 Hz.

As previously pointed out herein the arrangement for sequentially gating the controlled rectifiers of switching circuit 16 conductive as a function of the position of rotor 12 can take a wide variety of forms. The arrangement of course depends on the number of poles of the motor as explained in the patent to Kirk U.S. Pat. No. 3,483,458. The number of pick-up sensors can also vary as well as the type of sensing devices utilized. Thus, whereas the Kirk arrangement uses six sensors, three sensors can be utilized as disclosed in the patent to Hill U.S. Pat. No. 3,531,702 to develop the proper signals for gating the controlled rectifiers of switching circuit 16 and the sensors could be of the photoelectric type as disclosed in this Hill patent. Other rotor position sensing arrangements applicable to the system disclosed herein are those of the type employing transformers having E-shaped cores examples of which are disclosed in the U.S. Pat. Nos. to Tilly et al 3,281,629 and Moller 3,050,671.

It is claimed:

1. A motor power supply system comprising, a motor having a polyphase winding and a rotor, a field winding for said motor operative when energized by direct current to provide magnetic poles on said rotor, a switching circuit comprised of a plurality of controlled rectifiers, said switching circuit having input terminals and output terminals connected with said polyphase motor winding, means for causing groups of said controlled rectifiers of said switching circuit to be gated conductive in a predetermined sequence as a function of rotor position to thereby provide current paths for energizing said polyphase winding in a predetermined polyphase sequence, each group of controlled rectifiers when gated conductive defining a full-wave rectifier circuit that is operative to apply a direct voltage to predetermined phases of said polyphase winding, the switching frequency of said controlled rectifiers being a function of rotor speed, a source of direct voltage, inverter means having an input connected to said source of direct voltage and having an output circuit, said inverter means providing a variable frequency alternating output voltage at its output circuit, a circuit connecting the output circuit of said inverter means to said input terminals of said switching circuit including coupling capacitor means connected in series between said inverter means and said switching circuit, means for varying the frequency of the alternating output voltage of said inverter means whereby the reactance of said coupling capacitor means is varied as a function of the output frequency of said inverter means to thereby control the amount of power supplied to said switching circuit from said inverter means, and means for energizing said field winding with direct current.

2. A motor power supply system comprising, a motor having a polyphase winding and a rotor, a field winding for said motor operative when energized with direct current to provide magnetic poles on said rotor, a switching circuit comprised of a plurality of controlled rectifiers, said switching circuit having input terminals and output terminals connected with said polyphase winding, means for causing groups of said controlled rectifiers of said switching circuit to be gated conductive in a predetermined sequence as a function of rotor position to thereby provide current paths for energizing said polyphase winding in a predetermined polyphase sequence, each group of controlled rectifiers when gated conductive defining a full-wave rectifier circuit that is operative to apply a direct voltage to predetermined phases of said polyphase winding, the switching frequency of said controlled rectifiers being a function of rotor speed, a source of direct voltage, inverter means having an input circuit connected to said source of direct voltage and having an output circuit, said inverter means providing a variable frequency alternating output voltage at its output circuit, a circuit connecting the output circuit of said inverter means to said input terminals of said switching circuit including coupling capacitor means connected in series between said inverter means and said switching circuit, means for varying the frequency of the alternating output voltage of said inverter means whereby the reactance of said coupling capacitor means is varied as a function of the output frequency of said inverter means to thereby control the amount of power supplied to said switching circuit from said inverter means, and means including rectifier means connected between the input circuit to switching circuit and said field winding operative to energize said field winding with a direct voltage that is proportional to the input current to said switching circuit.

3. A motor power supply system comprising, a motor having a polyphase winding, a switching circuit comprised of a plurality of controlled rectifiers having input terminals and output terminals connected with said polyphase winding, said switching circuit sequentially energizing the phase windings of said polyphase winding in a predetermined sequence, a source of direct voltage, an inverter having an input connected to said source of direct voltage and having an output, said inverter developing a variable frequency output voltage at said output, means connecting the output of said inverter to the input terminals of said switching circuit including a first coupling capacitor, voltage developing means connected across the input terminals of said switching circuit for developing a voltage which is a function of the input voltage to said switching circuit, a second capacitor, means including a first rectifying circuit for charging said second capacitor from said voltage developing means, current responsive means for developing an alternating voltage which is a function of the input current to said switching circuit, and a second rectifying circuit connected to said current responsive means, the direct voltage output terminals of said second rectifying circuit being connected in series with said source of direct current and in series with said second capacitor.

4. A motor power supply system comprising, a source of direct current, inverter means having an input connected to said source of direct current, said inverter means having an output providing an alternating voltage, means for varying the output frequency of the alternating voltage developed at the output of said inverter means, a motor having a polyphase winding and a rotor, said motor having a field winding for developing magnetic poles on said rotor, a switching circuit comprised of a plurality of controlled rectifiers having an input and output connected to said polyphase winding, means for causing said controlled rectifiers to become conductive in a predetermined sequence related to rotational position of said rotor to thereby control the energization of said polyphase winding, means connecting the output of said inverter means and the input of said switching circuit including a coupling capacitor, current transformer means operative to develop an alternating voltage which is proportional to the current passing through said coupling capacitor, rectifier means for rectifying said alternating voltage to a direct voltage, and means for applying said direct voltage to the field winding of said motor.

* * * * *